United States Patent [19]

Dudgeon

[11] 4,374,751

[45] Feb. 22, 1983

[54] POLYMERIZATION INITIATOR COMPOSITIONS

[75] Inventor: Charles D. Dudgeon, Clifton Park, N.Y.

[73] Assignee: General Electric Company, Schenectady, N.Y.

[21] Appl. No.: 176,723

[22] Filed: Aug. 8, 1980

[51] Int. Cl.³ .............................................. B01J 31/02
[52] U.S. Cl. ..................................... 252/426; 252/428
[58] Field of Search ................................ 252/426, 428

[56] References Cited

U.S. PATENT DOCUMENTS

| | | | |
|---|---|---|---|
| 2,807,648 | 9/1957 | Pitt | 260/607 |
| 2,935,488 | 5/1960 | Phillips et al. | 260/45.4 |
| 3,235,620 | 2/1966 | Phillips et al. | 260/830 |
| 3,369,055 | 2/1968 | Salyer et al. | 260/830 |
| 3,379,653 | 4/1968 | Pfeffingen et al. | 260/2 |
| 3,398,211 | 8/1968 | Ramos | 260/830 |
| 3,403,199 | 9/1968 | Ramos | 260/830 |
| 3,563,850 | 2/1971 | Stackhouse et al. | 161/184 |
| 3,567,797 | 3/1971 | Mango et al. | 260/830 |
| 3,677,995 | 7/1972 | Earing | 260/37 EP |
| 3,708,296 | 1/1973 | Schlesinger | 96/33 |
| 4,138,255 | 2/1979 | Crivello | 96/35.1 |

OTHER PUBLICATIONS

Knapczyk et al., *Reactions of Triarylsulfonium Salts with Bases*, J. Amer. Chem. Soc., vol. 91, pp. 145–150, 1969.
Maycock et al., *Photochemical Reactions of Phenacyl and Benzylsulfonium Salts*, vol. 35, No. 8, pp. 2532–2538, 1970.
Leicester et al., *Salts of Triphenylselenonium Hydroxide*, J. Amer. Chem. Soc., vol. 51, pp. 3587–3591, 1927.
*Epoxy Resins*, Encyclopedia of Polymer Science and Technology, vol. 6, pp. 209–222, 1967.
Plueddemann et al., *Epoxyorganosiloxanes*, J. Amer. Chem. Soc., vol. 81, pp. 2632–2635, 1959.
Goethals et al., *Reactions of Dimethyl Sulfoxide*, Soc. Chem. Belg., vol. 73, pp. 546–559, 1964.

*Primary Examiner*—W. J. Shine
*Attorney, Agent, or Firm*—Hedman, Casella, Gibson & Costigan

[57] ABSTRACT

Improved polymerization initiators are described. The combination of radiation sensitive sulfonium or iodonium salts of a Bronsted Acid with an activating peroxide compound may be employed to effect epoxide polymerization.

16 Claims, No Drawings

POLYMERIZATION INITIATOR COMPOSITIONS

BACKGROUND OF THE INVENTION

Epoxy resins have generally been employed in a variety of applications requiring high performance materials. Cure of an epoxy resin can generally be achieved by two package systems based on the incorporation into the resin of active amine-containing compounds or carboxylic acid anhydrides. These systems require thorough mixing of the ingredients; in addition, cure time can be several hours.

Another catalyst which can be used to cure epoxy resins as "one package" systems is based on the employment of a Bronsted Acid catalyst in the form of an amine complex such as boron trifluoride-monethyl amine. The Bronsted Acid is released on heating; cure takes place within 1 to 8 hours and can require a temperature of 160° C. and higher. As a result, these one package epoxy compositions cannot be employed to coat heat sensitive devices such as delicate electronic components. Nor can epoxy monomers having low boiling points be used due to the resulting losses to evaporation during cure.

As shown by Schlesinger, U.S. Pat. No. 3,703,296, certain photosensitive aromatic diazonium salts can be employed to cure epoxy resins. When photolyzed, these aromatic diazonium salts are capable of releasing, in situ, a Bronsted Acid catalyst which can initiate the rapid polymerization of the epoxy resin. However, even though these one package epoxy resin mixtures can provide fast curing compositions, a stabilizer must be used to minimize cure in the dark during storage of these mixtures. Despite the measures, gellation of the mixture can occur even in the absence of light. In addition, nitrogen is released during UV-cure, which can result in film imperfections. Diazonium salts are generally thermally unstable, rendering the use of such materials hazardous because of the possibility of run-away decomposition.

U.S. Pat. No. 4,138,255 of Crivello describes yet another catalyst system. It employs radiation sensitive aromatic onium salts of the formula:

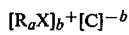

where R is a monovalent aromatic organic radical, $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals, X is a Group VIa element selected from sulfur, selenium and tellurium, M is a metal or metalloid, Q is a halogen radical, a is a whole number equal to 0 to 3 inclusive, b is a whole number equal to 0 to 2 inclusive, c is a whole number equal to 0 to 1, where the sum of a+b+c is a value equal to 3 or the valence of X, $$d = e - f$$

f = valence of M and is an integer equal to from 2 to 7 inclusive e is >f and is an integer having a value up to 8. These catalysts are ordinarily activated by radiant energy such as an electron beam or ultraviolet light.

Notwithstanding these available systems, additional polymerization initiators have been sought. These include initiators which are thermally activatable and, in particularly, which are activated only at elevated temperatures so as to be stable under ambient conditions.

These and yet additional objectives or advantages are obtained in accordance with the present invention.

INTRODUCTION TO THE INVENTION

The present invention relates to compositions for use in epoxy resin polymerization. The compositions contain a polymerization initiator which is a radiation sensitive sulfonium or iodonium salt of a Bronsted Acid polymerization catalyst. In admixture with the initiator is a peroxide compound.

When in admixture with curable epoxy resin under ambient conditions, the composition remains inert. Upon heating, however, the peroxide compound operates by causing the initiator to release its Bronsted Acid catalyst for resin polymerization. Consequently, temperature can be utilized to restrain or activate the polymerization reaction.

DESCRIPTION OF THE INVENTION

The polymerization initiator of the present compositions is a radiation sensitive onium salt having the formula:

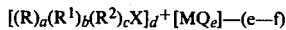

wherein:
each R is a monovalent organic aromatic radical;
X is selected from the group consisting of sulfur and iodine;
C is a Bronsted Acid polymerization catalyst precursor;
a equals the absolute value of (the valence number of X minus 1); and
b equals the absolute value of the valence number of C.
It is combined with an amount of a peroxide compound effective to activate said polymerization initiator.

Suitable aromatics for R in this formula are, for example, $C_{(6-13)}$ hydrocarbon radicals such as phenyl, tolyl, naphyl and anthryl or heterocyclic radicals such as pyridyl and furfuryl. In addition, these aromatic radicals may be substituted with up to 1 to 4 monvalent radicals including $C_{(1-8)}$ alkoxy, $C_{(1-8)}$ alkyl, nitro, halo and hydroxy radicals. While different R radicals may be present in a given salt, ordinarily they are identical.

C in this formula may be the precursor of a Bronsted Acid catalyst for the polymerization of epoxy resins. They are well-known and primarily include halides of transition or rare earth metals or of metalloids. Representative are $BF_4^-$, $PF_6^-$, $FeCl_4^-$, $SnCl_6^-$, $BiCl_4^{-2}$, $AlF_6^{-3}$, $GaCl_4^-$, $InF_4^-$, $TiF_6^{-2}$, and $ZrF_6^-$. Particularly preferred are $AsF_6^-$ and $SbF_6^-$.

Onium salts of the present invention are well known. They can be made by the procedures shown in J. W. Knapcayk and W. E. McEwen, J. Am. Chem. Soc. 91 145 (1969); A. L. Maycock and G. A. Berchtold, J. Org. Chem. 35, No. 8, 2532 (1970); H. M. Pitt, U.S. Pat. No. 2,807,648; E. Groethals and P. De Badzctzky, Bul. Soc. Chem. Bleg., 73 546 (1964); H. M. Leicester and F. W. Berstrom, J. Am. Chem. Soc. 51 3587 (1927).

These initiators may be produced by combination of an onium salt of a strong acid anion (such as $Cl^-$, $HSO_4^-$ or $NO_3^-$) with a Bronsted Acid salt of a strong basic cation (such as $Na^+$ or $NH_4^+$). As a result, the initiator may even be produced in situ within the epoxy resin composition to be polymerized.

The present compositions must also include a peroxide compound effective to activate the polymerization catalyst. Ordinarily, an organic peroxide such as butyl perbenzoate, dicumyl peroxide or the like is employed. These peroxides are desirably essentially stable up to at least 50° and more preferably 100° C. This ensures their presence when polymerization is induced through exposure to still higher temperatures.

The amount of peroxide compound in the present compositions is not critical so long as enough to activate the polymerization initiator is present. Ordinarily at least 10%, preferably 20%, by weight of initiator is utilized. While an excess is generally desirable, more than an equal weight of initiator is usually avoided.

The compositions of the present invention are normally further admixed with (if not produced within) a curable epoxy resin. This may be done shortly prior to thermal activation. Because of their stability, they may also be admixed and then stored for considerable periods of time before actual activation and use.

Those "curable epoxy resins" suitable for use in accordance with the present invention include any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl arylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl arylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp 209–271.

The amount of curable epoxy resin with which the present admixture of initiator and peroxide is combined is not critical and may vary widely. It is preferred, however, to employ from 1 to 15% initiator by weight of resin. This ensures complete polymerization without waste of excess initiator.

The compositions of this invention may additionally include various ingredients inert to the polymerization reaction. These include dyes, pigments, viscosity control agents and, most importantly, filler. Filler is especially desirable because it effectively extends the volume of the product epoxy. Conventional fillers are generally employed in from 10 to 100% by weight of epoxy resin.

In a preferred embodiment of this invention, a filler which is powdered aluminum metal is employed in the composition. Such an aluminum filler permits utilization of the present compositions as a plastic body solder.

Application and use of the present compositions proceeds readily. The composition may take any number of forms. Commonly, for example, it will be a free-flowing powdered admixture. Alternatively, it may include a solvent or other liquid carrier so as to range, dependant on amount, from a paste to a varnish. As such it may exhibit a viscosity of about 1 to 100,000 centipoise at 25° C. Whatever its form, however, the composition including curable epoxy resin is first applied where and as desired for cured product.

Some of the uses to which present compositions may be put involve very different environments. For example, they may be employed to produce protective, decorative or insulating coatings; inks; sealants; adhesives; printing tapes; and the like. As such, they are ordinarily first applied as thin films or coverings, but to a number of different, possible substrates.

So long as the composition has not yet been activated, it remains quite stable. Therefore, at or below a temperature of from about 50° to 100° C. (depending upon the particular initiator and peroxide present) no significant polymerization or curing occurs.

To then commence this reaction, the composition need only be heated to, or above, its specific activation temperature. Polymerization then commences. Normally, however, a temperature of at least 25, and preferably at least 50, centigrade degrees above the activation point is actually utilized. With such a differential, the rate of polymerization is greatly accelerated.

As above indicated, each specific combination of initiator and peroxide in the present compositions has its own individual characteristics of activation temperature and cure rate at higher temperatures. These variations allow a highly desirable latitude in use of this invention with specific substrates and in particular manufacturing processes.

For example, another preferred embodiment of the present invention involves production of mica tape laminates. The conventional production processes for these processes require long exposure of resin to elevated temperatures (often about 100° C. for 1 hour) before lamination and curing. With the present compositions, such an exposure may readily be endured and final cure/polymerization obtained by a subsequent increase in temperature to, for example, 150° C.

The present invention will be more completely understood from the following examples. They are provided by way of illustration, and not limitation, of its scope. Unless otherwise indicated therein, all proportions are by weight.

EXAMPLE I

A mixture of 100 g of 3,4-epoxycyclohexylmethyl-3,4-epoxycyclohexane carboxylate (ERL-4221 produced by Union Carbide) with 4 g of an initiator of 50% triphenylsulfonium hexafluoroantimonate in propylene carbonate and 0.6 g of dicumyl peroxide was prepared. Approximately 10 g of the mixture was then placed in an aluminum weighing cup in an oven set at 150° C. The resin gelled in about 30 minutes and was hard and well cured in 3.5 hours.

In contrast, control samples of the resin, with only one or the other of the triphenyl sulfonium hexafluoroantimonate blend or dicumyl peroxide, were essentially inert under the same conditions. Neither gelled after 2 hours at 150° C. These results showed the cooperative effect of the ingredients of the present invention.

EXAMPLE II

Samples containing 100 g of the epoxy resin of Example I were admixed with varying amounts of an initiator (50% triphenylsulfonium hexafluoroantimonate in propylene carbonate) and t-butyl perbenzoate. The samples were then cured to a gel under the conditions noted in TABLE I.

TABLE I

| Sample No. | Initiator | Peroxide | Temperature | Gel Time[a] |
|---|---|---|---|---|
| 1 | 4g | 2g | 150° C. | 12.0 min. |
| 2 | 6g | 1g | 150° C. | 13.3 min. |
| 3 | 4g | 1g | 150° C. | 14.9 min. |
| 4 | 4g | 1g | 135° C. | 105.0 min. |
| 5 | 4g | 1g | 100° C. | 23.0 hour |

[a]Sunshine gel time meter is used.

A comparison between the results of Sample Nos. 1–3 shows that the concentration of initiator/peroxide has only a limited effect on polymerization rate. Comparing sample Nos. 3–5, however, the importance of temperature is evident. Below 100° C., the composition is relatively stable. By increasing the temperature to 150° C., however, the polymerization reaction is activated and proceeds at a rapid rate.

EXAMPLE III

A blend of 60 g of the epoxy resin of Example I and 40 g of bisphenol-A diglycidyl ether epoxy resin (Epon 828 produced by Shell Chemical Co.) were mixed with 4 g of initiator (50% triphenylsulfonium hexafluoroantimonate in propylene carbonate) and 1 g of t-butyl peroxide.

Samples of the admixture were then heated in a sunshine gel tester until gelled. At 150° C., the gel time was 22.3 min; at 135° C., 4 hours.

A further sample was then placed in an oven at 60° C. and aged for 32 hours. During this time there was no apparent increase in viscosity. Upon then being heated to 150° C., the sample showed a gel time of 26.3 minutes.

These results emphasize the storage stability of the present compositions. Even after lengthy, high temperature-accelerated aging, the sample showed no significant loss of activity.

EXAMPLE IV

The procedure of Example I was repeated substituting 2.8 g of an initiator of 71.4% diphenyliodonium hexafluoroarsenate in propylene carbonate and 1 g of t-butyl perbenzoate. At 150° C., had a gel time of 4.8 minutes.

EXAMPLE V

The procedure of Example IV was repeated substituting 100 g. of diglycidyl ether of bisphenol-A (Epon 826) as the epoxy resin. For this sample, the gel time at 150° C. was 3.5 minutes.

EXAMPLE VI

A plastic body solder was prepared by blending 167 g. of powdered aluminum (Alcoa 101) with an admixture of 76.13 g. of ERL-4221 and 19.06 g. of hydroxy-terminated butadiene acrylonitrile copolymer (Goodyear, HTBN) containing 4.04 g. of diphenyliodonium hexafluoronoarsenate (71.4% in phenylene carbonate) and 2 g. of t-butyl perbenzoate.

The solder was stable for a minimum of 9 months at 25° C., while gelling within 5.9 minutes at 150° C. In contrast, 5 months is about maximum stability of a combination employing diphenyliodonium hexafluoroarsenate/copper salts.

To more completely describe the present invention, the disclosures of the various articles and patents mentioned above are incorporated herein by reference. Obviously, many modifications and variations of the present invention are possible in the light of the above and other well-known teachings. It is therefore to be understood that changes may be made in the particularly described embodiments of this invention. All are within the full intended scope of the invention as defined in the appended claims.

I claim:

1. A composition comprising an admixture of a polymerization initiator which is a radiation sensitive onium salt having the formula:

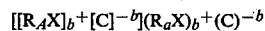

wherein:
 each R is a monovalent organic aromatic radical;
 X is selected from the group consisting of sulfur and iodine;
 C is a Bronsted Acid polymerization catalyst precursor;
 a equals the absolute value of (the valence number of X minus 1); and
 b equals the absolute value of the valence number of C; in combination with an amount of a peroxide compound effective to activate said polymerization initiator.

2. The composition of claim 1, wherein C is hexafluoroantimonate or hexafluororarsenate.
3. The composition of claim 1, wherein the peroxide is an organic compound present in an amount which is at least 10% by weight of the initiator.
4. The composition of claim 1, wherein each R is a phenyl radical.
5. The composition of claim 1, wherein C is $BF_4^-$.
6. The composition of claim 1, wherein C is $PF_6^-$.
7. The composition of claim 1, wherein C is $FeCl_4^-$.
8. The composition of claim 1, wherein C is $SnCl_6^-$.
9. The composition of claim 1, wherein C is $BiCl_4^{-2}$.
10. The composition of claim 1, wherein C is $AlF_6^{-3}$.
11. The composition of claim 1, wherein C is $GaCl_4^-$.
12. The composition of claim 1, wherein C is $InF_4^-$.
13. The composition of claim 1, wherein C is $TiF_6^{-2}$.
14. The composition of claim 1, wherein C is $ZrF_6^-$.
15. The composition of claim 1, wherein C is $AsF_6^-$.
16. The composition of claim 1, wherein C is $SbF_6^-$.

* * * * *

UNITED STATES PATENT AND TRADEMARK OFFICE
CERTIFICATE OF CORRECTION

PATENT NO. : 4,374,751

DATED : February 22, 1983

INVENTOR(S) : Charles D. Dudgeon

It is certified that error appears in the above-identified patent and that said Letters Patent is hereby corrected as shown below:

Claim 1, line 3, "$[[R_A X]_b + [C]^{-b}] (R_a X)_b + (C)^{-b}$" should read -- $(R_a X)_b + (C)^{-b}$ --.

Signed and Sealed this

Twenty-eighth Day of June 1983

[SEAL]

Attest:

GERALD J. MOSSINGHOFF

Attesting Officer     Commissioner of Patents and Trademarks